United States Patent
Last

(10) Patent No.: US 11,048,789 B2
(45) Date of Patent: *Jun. 29, 2021

(54) AUTOMATED DEVICE ACCESS

(71) Applicant: Apple Inc., Cupertino, CA (US)

(72) Inventor: Matthew E. Last, Santa Clara, CA (US)

(73) Assignee: Apple Inc., Cupertino, CA (US)

(*) Notice: Subject to any disclaimer, the term of this patent is extended or adjusted under 35 U.S.C. 154(b) by 22 days.

This patent is subject to a terminal disclaimer.

(21) Appl. No.: 15/972,068

(22) Filed: May 4, 2018

(65) Prior Publication Data

US 2018/0324586 A1 Nov. 8, 2018

Related U.S. Application Data

(63) Continuation of application No. 14/444,914, filed on Jul. 28, 2014, now Pat. No. 9,992,674, which is a continuation of application No. 13/603,347, filed on Sep. 4, 2012, now Pat. No. 8,826,415.

(51) Int. Cl.
*H04W 12/08* (2021.01)
*G06F 21/35* (2013.01)
*H04L 29/06* (2006.01)
*H04W 12/06* (2021.01)

(52) U.S. Cl.
CPC ............ *G06F 21/35* (2013.01); *H04L 63/083* (2013.01); *H04L 63/0876* (2013.01); *H04L 63/101* (2013.01); *H04W 12/06* (2013.01); *H04W 12/08* (2013.01)

(58) Field of Classification Search
CPC ........ G06F 21/35; G06F 21/31; H04L 63/083; H04L 63/0876; H04W 12/06
See application file for complete search history.

(56) References Cited

U.S. PATENT DOCUMENTS

| 4,761,645 A | 8/1988 | Mochida |
| 7,242,278 B2 | 7/2007 | Sugimoto et al. |
| 7,254,708 B2 * | 8/2007 | Silvester ................. H04L 63/08 713/170 |

(Continued)

FOREIGN PATENT DOCUMENTS

| WO | 0205078 A2 | 1/2002 | |
| WO | WO-0205078 A2 * | 1/2002 | ............. G06F 21/32 |

OTHER PUBLICATIONS

Sebastian Anthony; "Microsoft creates Kinect-like system using your laptop's built-in speaker & microphone", ExtremeTeck, May 7, 2012.

(Continued)

*Primary Examiner* — Ali S Abyaneh
(74) *Attorney, Agent, or Firm* — Dickinson Wright RLLP

(57) ABSTRACT

A method of unlocking a locked device includes receiving a device identifier over a wireless communication protocol, determining if the device identifier is associated with a list of trusted devices, transmitting a request to generate an acoustic signal over the wireless communication protocol based on the determination, receiving the acoustic signal as an audio sound generated external to the locked device, estimating a distance between a source of the audio sound and the locked device, and unlocking the locked device based on the estimation.

20 Claims, 7 Drawing Sheets

(56) References Cited

U.S. PATENT DOCUMENTS

| | | | | |
|---|---|---|---|---|
| 7,260,221 | B1* | 8/2007 | Atsmon | G06F 21/35 380/247 |
| 7,283,034 | B2 | 10/2007 | Nakamura et al. | |
| 7,378,939 | B2* | 5/2008 | Sengupta | H04M 1/67 340/5.64 |
| 7,401,224 | B2* | 7/2008 | Gantman | G06Q 20/341 713/170 |
| 7,446,644 | B2 | 11/2008 | Schaffzin et al. | |
| 8,132,236 | B2* | 3/2012 | Hawkins | H04L 63/08 726/4 |
| 8,826,415 | B2 | 9/2014 | Last | |
| 9,992,674 | B2 | 6/2018 | Last | |
| 2007/0190975 | A1* | 8/2007 | Eonnet | H04L 63/18 455/411 |
| 2008/0269961 | A1 | 10/2008 | Shitanaka et al. | |
| 2008/0284565 | A1* | 11/2008 | Duffy | G06F 21/34 340/5.86 |
| 2010/0144275 | A1* | 6/2010 | Satou | H04W 12/06 455/41.2 |
| 2011/0314530 | A1* | 12/2011 | Donaldson | G06F 21/83 726/7 |
| 2012/0131230 | A1* | 5/2012 | Ady | G06F 21/44 710/8 |
| 2012/0171963 | A1* | 7/2012 | Tsfaty | H04B 11/00 455/41.3 |
| 2013/0203345 | A1* | 8/2013 | Fisher | H04B 11/00 455/41.1 |

OTHER PUBLICATIONS

Padgette et al.; "NIST Special Publication 800-121, Revision 2", Guide to Bluetooth Security, National Institute of Standards and Technology, U.S. Department of Commerce, http://nvlpubs.nist.gov/nistpubs/SpecialPublications/NIST.SP.800-121r2.pdf.

\* cited by examiner

AUTOMATED DEVICE ACCESS

CROSS-REFERENCE TO RELATED APPLICATIONS

This application is a continuation of U.S. application Ser. No. 14/444,914, entitled "AUTOMATED DEVICE ACCESS," filed Jul. 28, 2014, now U.S. Pat. No. 9,992,674 issued Jun. 5, 2018, which is a continuation of U.S. application Ser. No. 13/603,347, entitled "AUTOMATED DEVICE ACCESS," filed Sep. 4, 2012, now U.S. Pat. No. 8,826,415 issued Sep. 4, 2014, the contents of which are incorporated herein by reference in their entirety for all purposes.

FIELD

The described embodiments relate generally to locked devices, and more particularly, to automated access to locked devices.

BACKGROUND

Conventionally, a computing device may be locked using a password authentication methodology by which a user may gain access to the locked device upon entry of an alphanumeric password or passcode stored on the device. The password authentication methodology may allow a fixed number of attempts before locking out the device or requiring administrative access or a hard reset.

Generally, repetitive password entry is cumbersome to users, particularly in environments where users repeatedly lock devices to secure information thereon, for example, to deter access by unauthorized individuals. However, conventional password methodologies require input of a password at every unlock request, and offer no alternative solutions to allow easier secure access to locked devices.

Therefore, what are needed are advancements and innovations in password authentication methodologies that overcome these and other drawbacks.

SUMMARY

This paper describes various embodiments that relate to automated device access to password locked devices.

According to one embodiment of the invention, a method of unlocking a locked device includes receiving a device identifier over a wireless communication protocol, determining if the device identifier is associated with a list of trusted devices, transmitting a request to generate an acoustic signal over the wireless communication protocol based on the determination, receiving the acoustic signal as sound generated external to the locked device, estimating a distance between a source of the sound and the locked device, and unlocking the locked device based on the estimation.

According to another embodiment of the invention, a method of unlocking a locked device includes detecting a presence of a trusted device over a wireless communication protocol, transmitting a request to generate an acoustic signal over the wireless communication protocol based on the detection, receiving the acoustic signal as sound generated external to the locked device, estimating a distance between a source of the sound and the locked device, and unlocking the locked device based on the estimation.

According to another embodiment of the invention, a method of unlocking a locked device includes authenticating a trusted device over a wireless communication protocol, transmitting a request to generate an acoustic signal over the wireless communication protocol based on the authentication, receiving the acoustic signal as sound generated external to the locked device, estimating a distance between a source of the sound and the locked device, and unlocking the locked device based on the estimation.

According to another embodiment of the invention, a method of unlocking a locked device includes authenticating a trusted device over a wireless communication protocol, transmitting an acoustic signal as sound generated at the locked device based on the authentication, receiving a copy of the acoustic signal over the wireless communication protocol, estimating a distance between the locked device and the trusted device based on the copy, and unlocking the locked device based on the estimation.

According to another embodiment of the invention, a system includes a locked device and a trusted device in communication with the locked device over a wireless communication protocol. The locked device is configured to automatically unlock in response to authentication of the trusted device and receipt of an acoustic signal generated or relayed by the trusted device.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

Various aspects of this disclosure may be better understood upon reading the following detailed description and upon reference to the drawings in which.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Generally, embodiments are directed to automated access to password protected computing devices or other hardware. Automated access is facilitated through use of a wireless communication protocol and an acoustic signal. The wireless communication protocol may be an established protocol having a stored listing of one or more trusted devices.

The acoustic signal may be an audio ping, sound, ultrasound, or modulation of sound configured to be emitted from the one or more trusted devices upon authentication via the wireless communication protocol. Receipt of the acoustic signal by the password protected computer device may automatically unlock the password protected computing device upon determining a physical distance of the one or more trusted devices is within a predetermined range.

Alternatively, the acoustic signal may be an audio ping, sound, ultrasound, or modulation of sound configured to be emitted from the password protected computing device or other hardware upon authentication of the one or more trusted devices via the wireless communication protocol. The one or more trusted devices may receive the acoustic signal and transmit a copy, version, or portion thereof to the password protected computing devices over the wireless communication protocol. Receipt of the copy, version, or portion of the acoustic signal by the password protected computer device may automatically unlock the password protected computing device upon processing of the received acoustic signal to determine/estimate a distance or correlate the received copy with an original signal or otherwise determining the trusted device is within a predetermined range.

Figure 1:
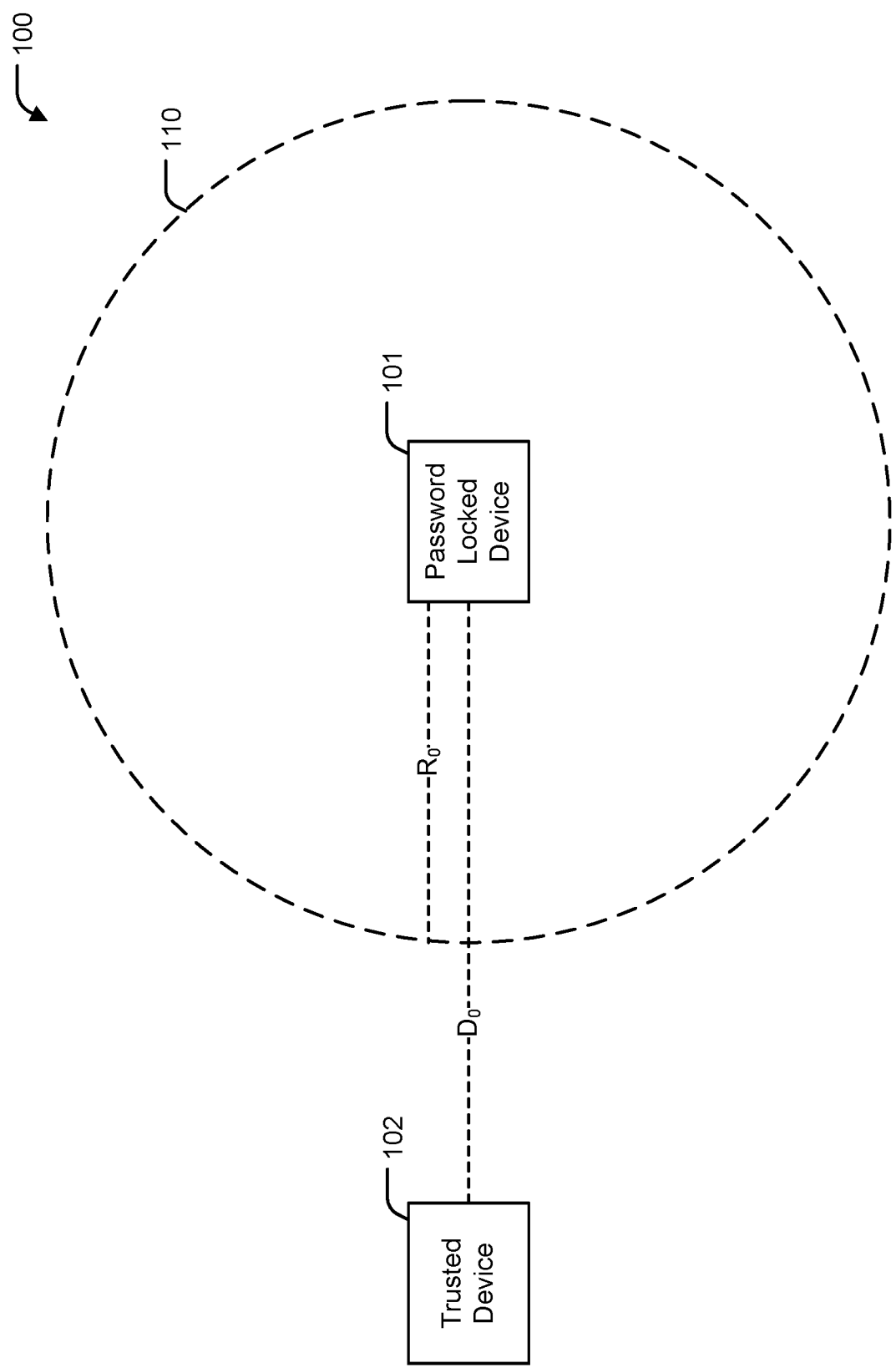
FIG. 1 is a diagram of a system for automated access to password locked devices, according to an embodiment of the invention.

Turning to FIG. 1, a system for automated access to password locked devices is illustrated, according to an embodiment of the invention. The system 100 may include a password locked or protected device 101 and a trusted device 102. According to embodiments, a predetermined automated entry distance $R_0$ may be established such that if the physical separation $D_0$ is less than or equal to $R_0$, the password locked device 101 may unlock with limited or reduced manipulation by a user. As illustrated, an overall bubble or range 110 about the password locked device 101 is based on the predetermined automated entry distance $R_0$. According to one embodiment of the invention, the predetermined automated entry distance $R_0$ is between about 3 to 5 feet (91.4 to 152.4 centimeters). According to another embodiment of the invention, the predetermined automated entry distance Ro is less than about 3 feet (91.4 centimeters). According to other embodiments, the predetermined automated entry distance $R_0$ is a user-configurable distance of any desirable range. Ranges of less than about 3 feet may be desirable in that there may be less possibility of unauthorized access due to a trusted device being in a general vicinity of a password locked device and automated unlocking occurring without an authorized user being in direct contact with the device.

Generally, the trusted device 102 and password locked device 101 may exchange information over an established wireless communication protocol, for example, via a radio interface. The wireless communication protocol may be any desirable protocol, including Bluetooth® protocols, Infrared protocols, IEEE 802.11-based protocols, or any suitable protocol allowing for the transfer of a request to output a particular acoustic signal from the device 101 to the device 102.

The trusted device 102 may have been previously subjected to a pairing protocol with the password protected device 101 such that wireless communication may be facilitated in a fairly automated fashion or using a master-slave structure. The pairing protocol may establish the trusted device 102 as a particular trusted device at the password protected device 101, for example, through inclusion of an identifier of the device 102 at a list of trusted devices stored on the password protected device 101. The list of trusted devices may be stored and accessed through the password protected device 101 such that a user may configure, edit, or delete entries in the list. According to one embodiment of the invention, the list of trusted devices is a list of paired or authenticated Bluetooth® devices such as, for example, wireless speakers, headsets, key fobs, or other devices.

The password protected device 101 may be any suitable device, including a personal computer, tablet computer device, cellular telephone, building security door apparatus, automobile, or any other device whereby automated access or entry is desirable under certain conditions, for example, in response to authentication of the trusted device 102 over the wireless communication protocol and receipt of an acoustic signal from the trusted device 102.

Hereinafter, a more detailed description of the trusted device 102 and the password protected device 101 is provided with reference to FIGS. 2-3.

Figure 2:
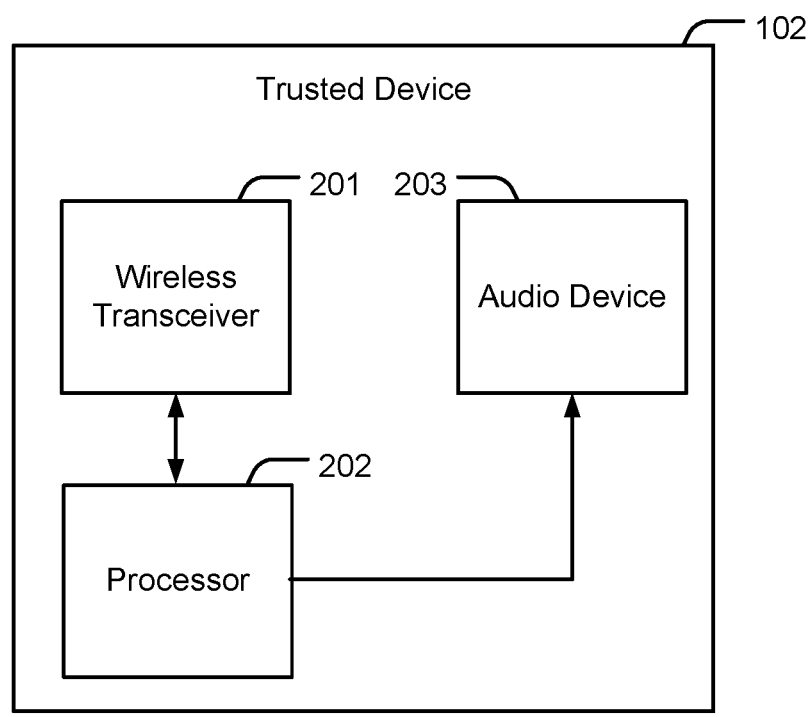
FIG. 2 is a diagram of a trusted device for automated access to password locked devices, according to an embodiment of the invention.

FIG. 2 is a diagram of a trusted device 102 for automated access to password locked devices, according to an embodiment of the invention. As illustrated, the trusted device 102 may include a wireless transceiver 201, a processor 202, and an audio device 203.

The wireless transceiver 201 may be any suitable transceiver including radio components allowing for communication via a wireless communication protocol such as, for example, Bluetooth®. The wireless transceiver 201 may therefore include any necessary antennas and radio components to facilitate this communication.

The processor 202 may be any suitable processor, including a dedicated processor tailored for operation of the device 102 as a slave device configured to receive packets of information relating to an acoustic signal and direct the audio device 203 to generate the acoustic signal. The processor 202 may also direct the device 102 to transmit a copy of a received/detected acoustic signal detected at the audio device 203 over the wireless communication protocol for receipt at a password locked device. The processor 202 may also be a general purpose computer processor or any other suitable processing device capable of performing at least portions of the methods described herein.

The audio device 203 may be a speaker/microphone or other device capable of reproducing/receiving an acoustic signal, respectively. The acoustic signal may be in any suitable range of frequencies including ultrasonic frequencies. According to one embodiment, at least a portion of the acoustic signal includes frequencies greater than about 20 kHz. According to one embodiment, at least a portion of the acoustic signal includes frequencies between about 18 kHz to 22 kHz. According to one embodiment, at least a portion of the acoustic signal includes frequencies between about 20 Hz to 20 kHz. According to one embodiment, the acoustic signal is a sample of identifiable white noise created at the password locked device 101. According to one embodiment, the acoustic signal is at least a portion of an audio file stored at the password locked device 101. According to one embodiment, the acoustic signal is a sequence of sounds identifiable at the password locked device 101. According to one embodiment, the acoustic signal is a dynamically generated acoustic signal formed through an algorithm processed by the password locked device 101.

As described above, the trusted device 102 may include a wireless transceiver, processor, and audio device capable of generating/receiving an acoustic signal based on commands received via a wireless communication protocol transmitted by the password locked device 101. Hereinafter, a more detailed description of the password locked device 101 is provided with reference to FIG. 3.

Figure 3:
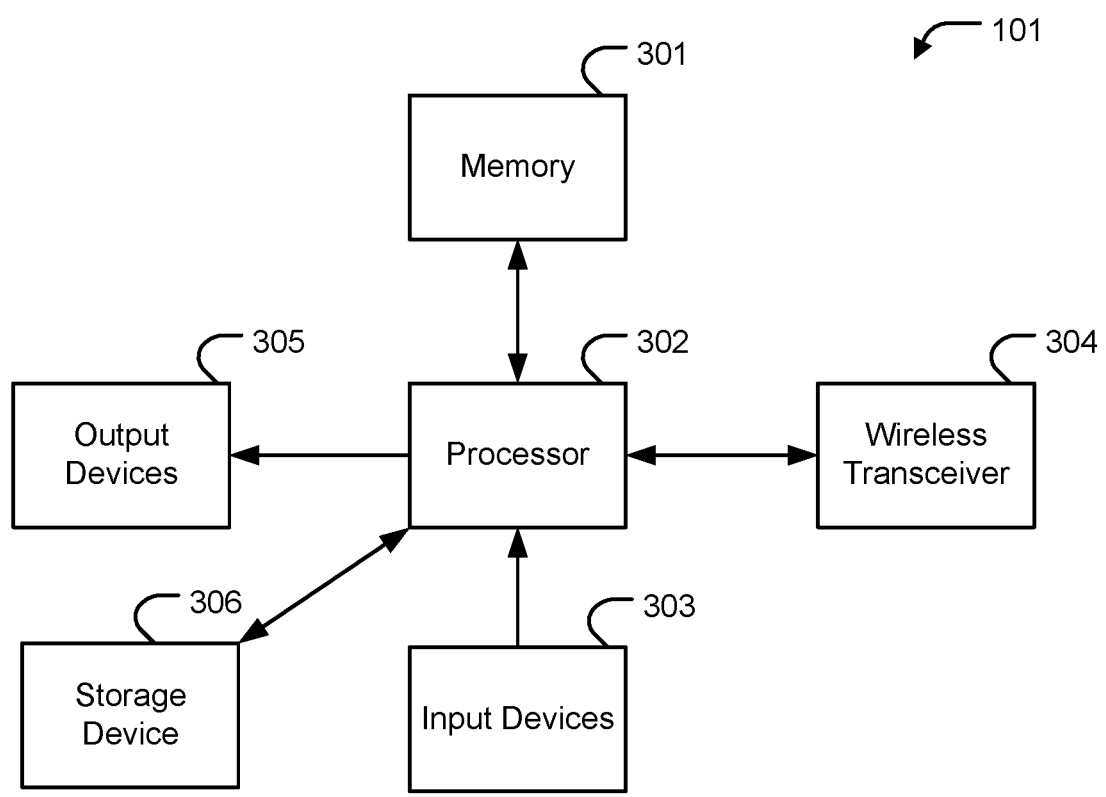
FIG. 3 is a diagram of a password locked device, according to an embodiment of the invention.

FIG. 3 is a diagram of password locked device 101, according to an embodiment of the invention. The device 101 may include memory 301 in operative communication with a processor 302. The memory 301 may be any memory suitable for at least temporarily storing instructions executable by processor 302. The processor 302 may be any suitable processor, including a general purpose computer processor.

The device 101 may further include input device 303 in communication with the processor 302. The input devices 303 may include any suitable devices, including one or more microphones capable of receiving an acoustic signal and relaying information related to the acoustic signal to the processor 302. The acoustic signal may be in any suitable range of radio frequencies including ultrasonic frequencies. According to one embodiment, at least a portion of the acoustic signal includes frequencies greater than about 20 kHz. According to one embodiment, at least a portion of the acoustic signal includes frequencies between about 18 kHz to 22 kHz. According to one embodiment, at least a portion of the acoustic signal includes frequencies between about 20 Hz to 20 kHz. According to one embodiment, the acoustic signal is a sample of identifiable white noise generated through the processor 302. According to one embodiment, the acoustic signal is at least a portion of an audio file stored in the memory 301 or storage device 306. According to one embodiment, the acoustic signal is a sequence of sounds identifiable through the processor 302.

The device 101 further includes wireless transceiver 304 in communication with the processor 302. The wireless transceiver 304 may be any suitable transceiver including radio components allowing for communication via a wireless communication protocol such as, for example, Bluetooth®. The wireless transceiver 304 may therefore include any necessary antennas and radio components to facilitate this communication.

The device 101 may further include output devices 305 in communication with the processor 302. The output devices 305 may include displays or other devices for outputting information to a user of the device 101. The output devices 305 may also include one or more speakers or transducers capable of generating an acoustic signal as described above.

The device 101 further includes computer readable storage medium or device 306. The computer readable storage device 306 may store instructions based on at least a portion of the methods described herein for processing and execution at the processor 302.

As described above, the device 101 may produce audio information or retrieve portions of audio files stored at the storage device 306, direct the trusted device 102 to playback the same as an acoustic signal, and receive the acoustic signal. Hereinafter, additional operational details are presented with reference to FIGS. 4-7.

Figure 4:
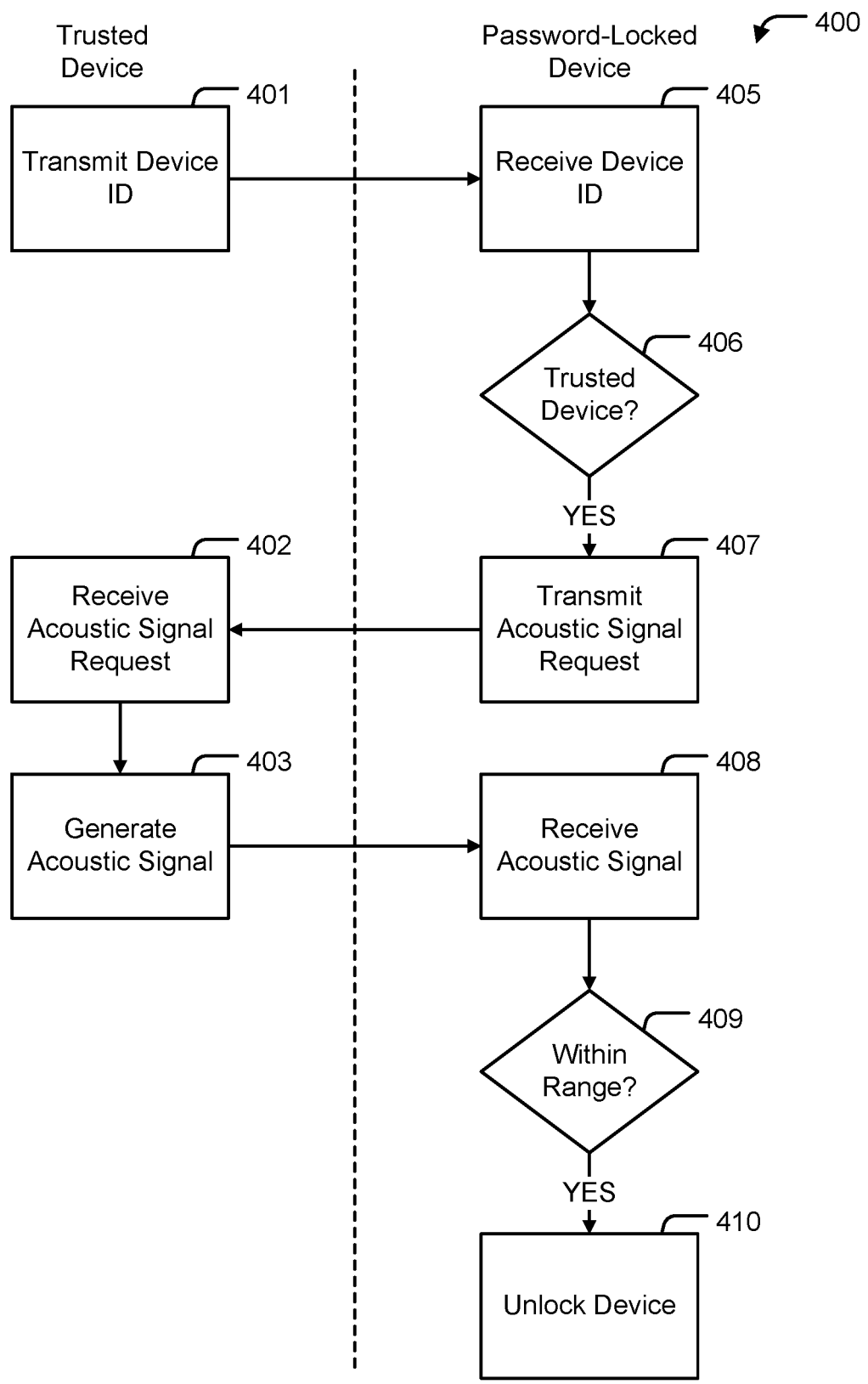
FIG. 4 is a flowchart of a method for automated access to password locked devices, according to an embodiment of the invention.

FIG. 4 is a flowchart of a method 400 for automated access to password locked devices, according to an embodiment of the invention. The method 400 includes transmitting a device ID over a wireless communication protocol at block 401. The device ID may be transmitted from a trusted device such as device 102. The device ID may be an identifier for authentication at a password protected device.

The method 400 further includes receiving, at the password protected device, the transmitted device ID at block 405. The method 400 further includes determining if the device ID is from a trusted device at block 406. If the device ID is not associated with a trusted device, the method 400 may terminate. If the device ID is associated with a trusted device, the method 400 includes transmitting a request to playback an acoustic signal at block 407. The request may direct a slave trusted device such as a Bluetooth® speaker or headset to playback an acoustic signal generated at the password protected device. The request may include a digital copy of an audio file or sample thereof comprising the acoustic signal.

The method 400 further includes receipt of the request at the trusted device at block 402, and generating the acoustic signal in response to receipt of the request at block 403.

The method 400 further includes receiving, at an input device of the password protected device, the acoustic signal at block 408. The input device may be a microphone or microphone array. Thereafter, the method 400 includes determining if a source of the acoustic signal is within a predetermined or desired range at block 409.

For example, the determining may be facilitated through a time of flight calculation based on the speed of sound. For example, audio information received at the input device of the password protected device may be autocorrelated with a digital copy of the acoustic signal stored at the password protected device. A correlation spike with a shortest delay corresponds with a propagation delay of the acoustic signal. If this propagation delay is below a threshold value (representative of the distance $R_0$), the method 400 includes unlocking the password protected device at block 410. Unlocking may include automated entry of a password through a password entry algorithm at the password protected device. According to one embodiment, unlocking the password protected devices includes waiting for a keystroke or other simple feedback (e.g., pressing a home button, power button, striking a return or enter key, etc) before unlocking to ensure a user desires automated device unlocking.

It should be understood that other forms of calculations may be made to facilitate estimating the distance of a source of the acoustic signal. Therefore, the embodiments described herein should not be limited to any particular form of time of flight calculation, but should include any equivalent or substantially similar calculations which provide a desirable estimate of distance between a source of an acoustic signal and a password protected device.

Figure 5:
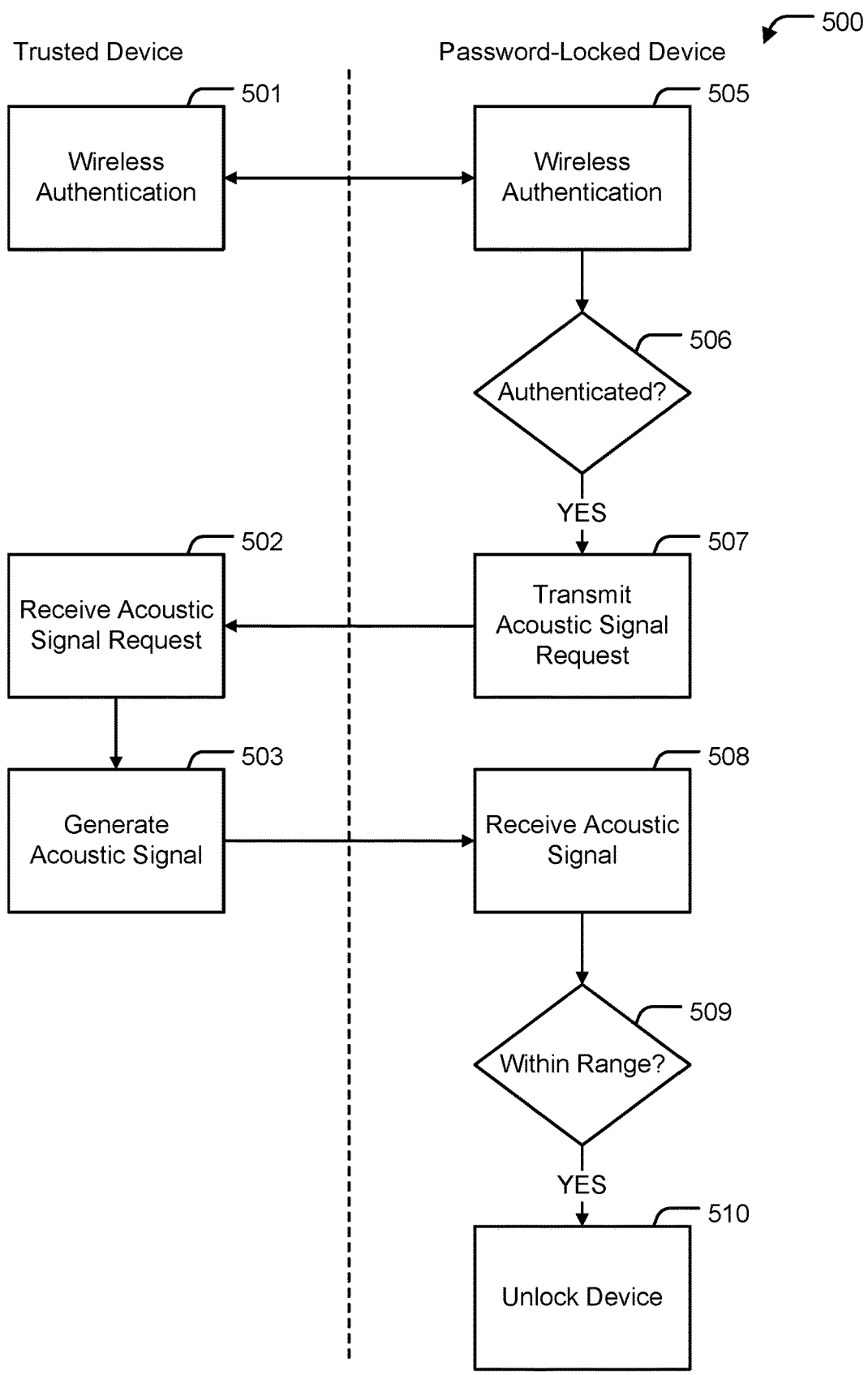
FIG. 5 is a flowchart of a method for automated access to password locked devices, according to an embodiment of the invention.

Similarly, although particularly described as requiring a determination that a received device ID belongs to a trusted device, any number of authentication protocols may be used. For example, FIG. 5 is a flowchart of a method 500 for automated access to password locked devices, according to an embodiment of the invention.

The method 500 includes a wireless authentication protocol being performed at a trusted device and a password locked device at blocks 501 and 505. The wireless authentication may include an authentication protocol, for example, a Bluetooth® authentication protocol outputting a value for determining if a trusted device is authenticated at block 506. The value may be a simple Boolean value returning a TRUE or FALSE indication of authentication.

Thereafter, the method 500 includes transmitting a request to playback an acoustic signal at block 507. The request may direct a slave trusted device such as a Bluetooth® speaker or headset to playback an acoustic signal generated at the password protected device. The request may include a digital copy of an audio file or sample thereof comprising the acoustic signal.

The method 500 further includes receipt of the request at the trusted device at block 502, and generating the acoustic signal in response to receipt of the request at block 503.

The method 500 further includes receiving, at an input device of the password protected device, the acoustic signal at block 508. The input device may be a microphone or microphone array. Thereafter, the method 500 includes determining if a source of the acoustic signal is within a predetermined or desired range at block 509, and unlocking the password protected device based on the determining at block 510.

The determining and unlocking may be altered from the particular forms illustrated, for example, as described above with reference to FIG. 4.

Figure 6:
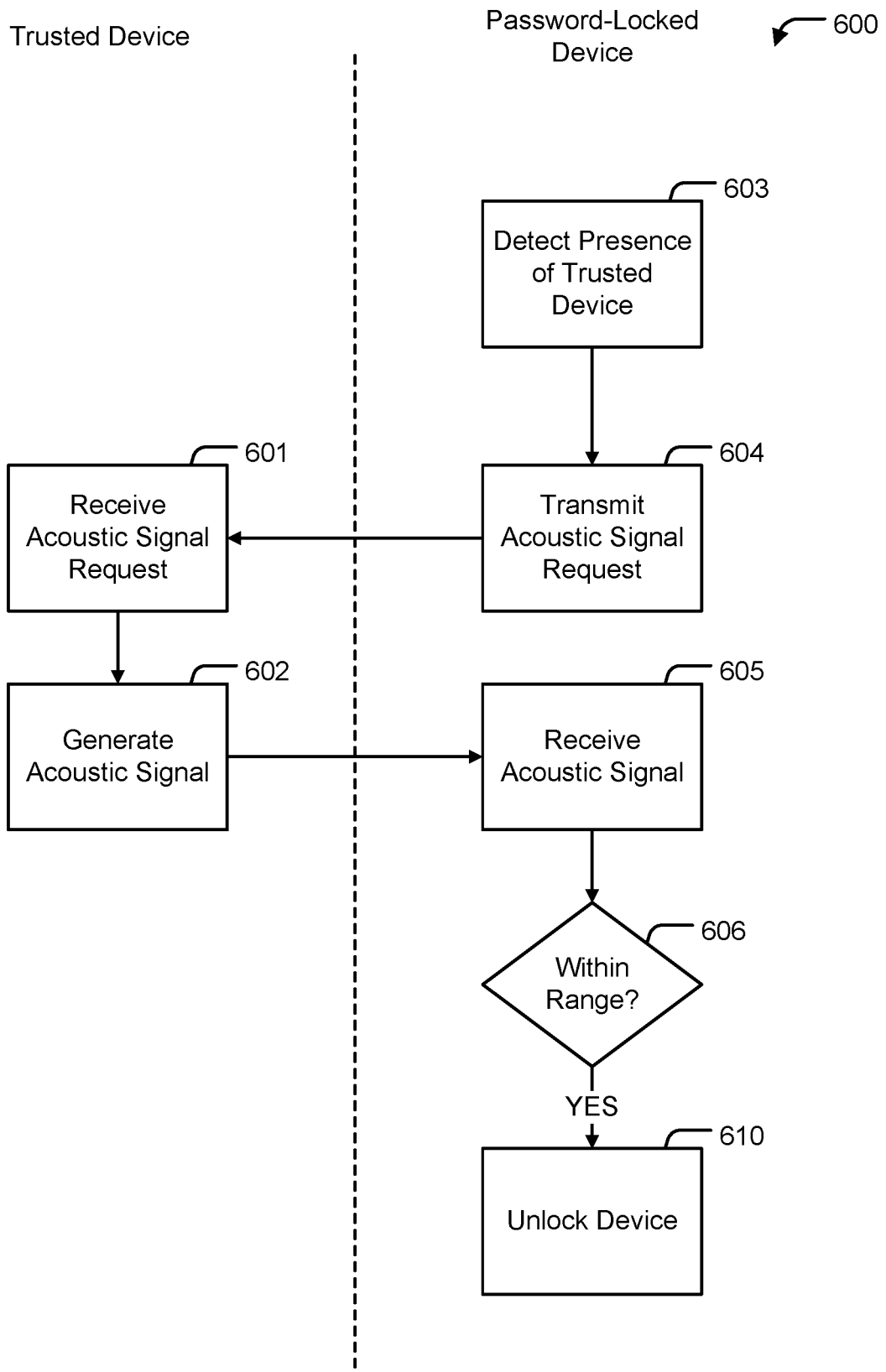
FIG. 6 is a flowchart of a method for automated access to password locked devices, according to an embodiment of the invention.

Additionally, although described as necessitating a wireless authentication protocol at blocks 501 and 505, it should be understood that the same may be varied to simply detect a presence of a previously authenticated device. For example, FIG. 6 is a flowchart of a method 600 for automated access to password locked devices, according to an embodiment of the invention.

The method 600 includes detecting a presence of a trusted device at block 603. The detection may be facilitated through a wireless communication protocol such as Bluetooth®. Upon detection of a trusted device, the method 600 includes transmitting a request to playback an acoustic signal at block 604. The request may direct a slave trusted device such as a Bluetooth® speaker or headset to playback an acoustic signal generated at the password protected device. The request may include a digital copy of an audio file or sample thereof comprising the acoustic signal.

The method 600 further includes receipt of the request at the trusted device at block 601, and generating the acoustic signal in response to receipt of the request at block 602.

The method 600 further includes receiving, at an input device of the password protected device, the acoustic signal at block 605. The input device may be a microphone or microphone array. Thereafter, the method 600 includes determining if a source of the acoustic signal is within a predetermined or desired range at block 606, and unlocking the password protected device based on the determining at block 610.

The determining and unlocking may be altered from the particular forms illustrated, for example, as described above with reference to FIGS. 4-5.

Figure 7:
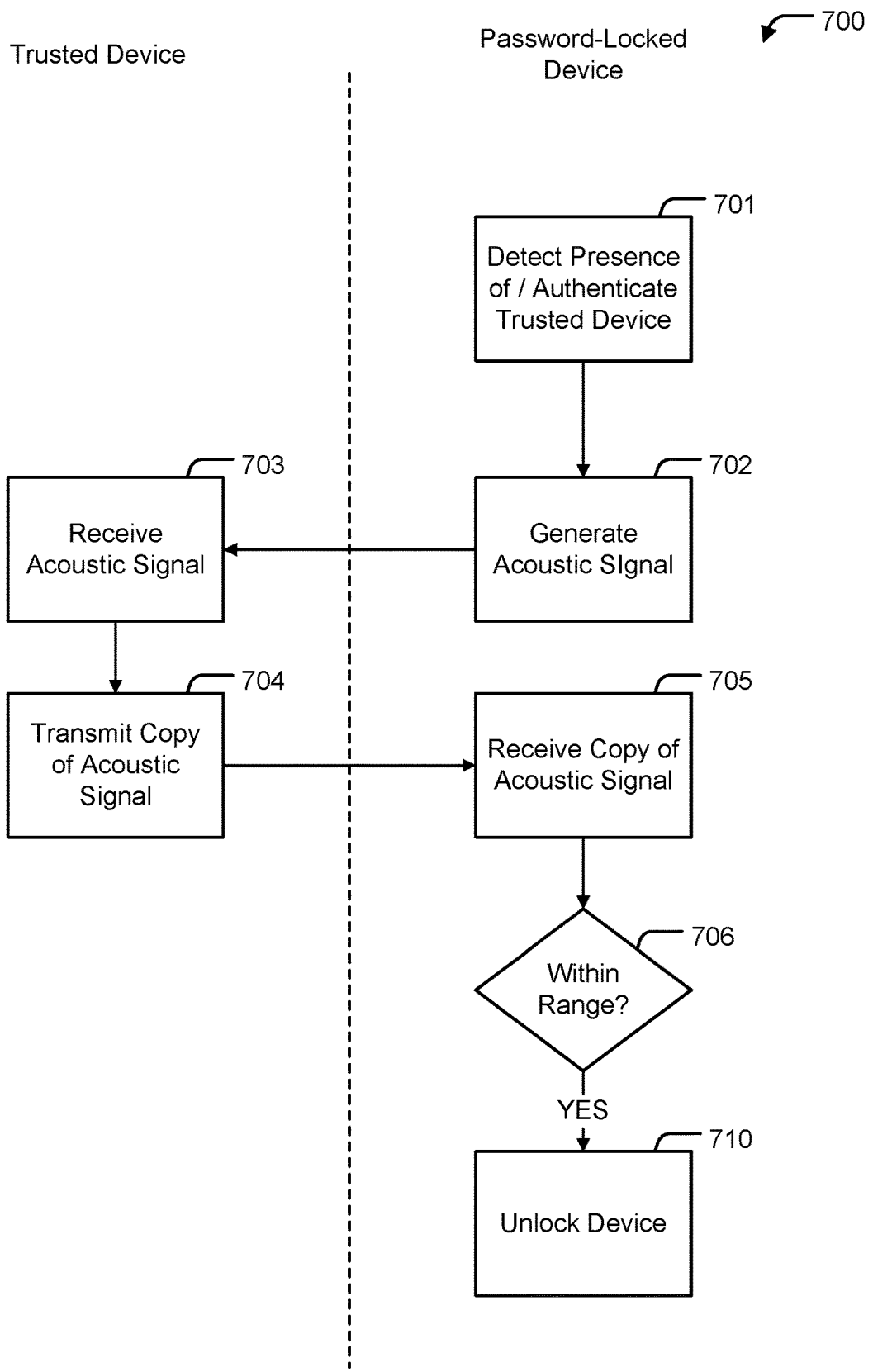
FIG. 7 is a flowchart of a method for automated access password locked devices, according to an embodiment of the invention.

Additionally, although the acoustic signal is described as being emitted from a trusted device, it should be understood that the same may be in many ways, for example, by allowing emission from the locked device or other hardware. FIG. 7 is a flowchart of a method 700 for automated access to password locked devices, according to an embodiment of the invention.

The method 700 includes detecting a presence and/or authentication of a trusted device at block 701. The detection/authentication may be facilitated through a wireless communication protocol such as Bluetooth® and may include any of the procedures described above. Upon detection / authentication of a trusted device, the method 700 includes generating an acoustic signal at block 702. The generating may include playback an acoustic signal through a speaker, transducer, or other hardware in operative communication with the password protected device.

The method 700 further includes receipt of the acoustic signal at the trusted device at block 703. The acoustic signal may be received by a microphone or other input device of the trusted device.

The method 700 further includes transmitting a copy of the acoustic signal in response to receipt of the signal at block 704. The copy may include a digital copy of an audio file or sample thereof comprising the acoustic signal received/detected by the trusted device. The copy may by immediately or substantially immediately transmitted by the trusted device such that time of flight of the originally generated acoustic signal from block 702 may be ascertained by the locked device. In this manner, the trusted device is relaying sound detected by an audio device of the trusted device (e.g., a microphone) over the wireless communication protocol (e.g., via a wireless transceiver).

For example, the method 700 further includes receiving, over the wireless communication protocol, the copy of the acoustic signal at block 705. The copy may be processed to determine coherence with the originally generated signal, and time of flight may be considered. As such, the method 700 includes determining if a source of the acoustic signal (e.g., a speaker of other hardware of the locked device) is within a predetermined or desired range from the trusted device (e.g., the microphone detecting the signal) at block 706, and unlocking the password protected device based on the determining at block 710.

As described above, the copy of the acoustic signal may be transmitted by the trusted device immediately upon detection of the acoustic signal. Thus, time delay between generation of the acoustic signal and receipt of the copy may be used to determine a relative distance between devices, and therefore, determine if the trusted device is within a predetermined or desired range for automated unlocking of the locked device.

Additional processing may occur at the trusted device or at the locked device than the processing particularly illustrated and described, for example, to better facilitate determination of distance, accuracy of the received copy, and/or other considerations. Therefore, the teachings described above should not be construed as limiting of all embodiments and implementations of the present invention.

Additional processing variables including ambient temperature and air pressure may also be included or considered during time of flight calculations or estimations described above.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling automated access operations or as computer readable code on a computer readable medium for controlling a password locked and/or trusted device. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for enabling a first device to cause a second device operating in a locked state to transition into operating in an unlocked state, the method comprising, at the first device:
  authenticating with the second device;
  receiving, from the second device, instructions for an algorithm for dynamically generating an audio signal; and
  causing the audio signal to be dynamically generated by executing the instructions for the algorithm, wherein:
    the audio signal enables the second device to calculate a physical distance between the first device and the second device, and
    the second device transitions into the unlocked state when the physical distance satisfies a threshold value.

2. The method of claim 1, wherein the first device generates the audio signal on an audio output device that is communicably coupled to the first device.

3. The method of claim 1, wherein authenticating with the second device comprises:
  detecting, via a wireless communications protocol, a presence of the second device; and
  establishing a communication channel with the second device.

4. The method of claim 3, wherein the wireless communications protocol is selected from a group radio technologies that include short-range wireless protocols.

5. The method of claim 3, wherein authenticating with the second device further comprises:
  transmitting, to the second device via the communication channel, a unique ID that is (i) associated with the first device, and (ii) trusted by the second device.

6. The method of claim 5, wherein the second device provides the instructions in response to determining that the unique ID is included in a list that includes a plurality of unique IDs that are trusted by the second device.

7. The method of claim 1, wherein the physical distance is calculated based on:
  a first time at which the instructions are transmitted by the second device, and
  a second time at which the audio signal is received by the second device.

8. At least one non-transitory computer readable storage medium configured to store instructions that, when executed by at least one processor included in a first device, cause the first device to cause a second device operating in a locked state to transition into operating in an unlocked state, by carrying out steps that include:
  authenticating with the second device;
  receiving, from the second device, instructions for an algorithm for dynamically generating an audio signal; and
  causing the audio signal to be dynamically generated by executing the instructions for the algorithm, wherein:
    the audio signal enables the second device to calculate a physical distance between the first device and the second device, and
    the second device transitions into the unlocked state when the physical distance satisfies a threshold value.

9. The at least one non-transitory computer readable storage medium of claim 8, wherein the first device generates the audio signal on an audio output device that is communicably coupled to the first device.

10. The at least one non-transitory computer readable storage medium of claim 8, wherein authenticating with the second device comprises:
  detecting, via a wireless communications protocol, a presence of the second device; and
  establishing a communication channel with the second device.

11. The at least one non-transitory computer readable storage medium of claim 10, wherein the wireless communications protocol is selected from a group radio technologies that include short-range wireless protocols.

12. The at least one non-transitory computer readable storage medium of claim 10, wherein authenticating with the second device further comprises:
  transmitting, to the second device via the communication channel, a unique ID that is (i) associated with the first device, and (ii) trusted by the second device.

13. The at least one non-transitory computer readable storage medium of claim 12, wherein the second device provides the instructions in response to determining that the unique ID is included in a list that includes a plurality of unique IDs that are trusted by the second device.

14. The at least one non-transitory computer readable storage medium of claim 8, wherein the physical distance is calculated based on:
  a first time at which the instructions are transmitted by the second device, and
  a second time at which the audio signal is received by the second device.

15. A first device configured to cause a second device operating in a locked state to transition into operating in an unlocked state, the first device comprising:
  at least one processor; and
  at least one memory storing instructions that, when executed by the at least one processor, cause the first device to perform steps that include:
  authenticating with the second device;
  receiving, from the second device, instructions for an algorithm for dynamically generating an audio signal; and
  causing the audio signal to be dynamically generated by executing the instructions for the algorithm, wherein:
    the audio signal enables the second device to calculate a physical distance between the first device and the second device, and
    the second device transitions into the unlocked state when the physical distance satisfies a threshold value.

16. The first device of claim 15, wherein the first device generates the audio signal on an audio output device that is communicably coupled to the first device.

17. The first device of claim 15, wherein authenticating with the second device comprises:
   detecting, via a wireless communications protocol, a presence of the second device; and
   establishing a communication channel with the second device.

18. The first device of claim 17, wherein the wireless communications protocol is selected from a group radio technologies that include short-range wireless protocols.

19. The first device of claim 17, wherein authenticating with the second device further comprises:
   transmitting, to the second device via the communication channel, a unique ID that is (i) associated with the first device, and (ii) trusted by the second device.

20. The first device of claim 19, wherein the second device provides the instructions in response to determining that the unique ID is included in a list that includes a plurality of unique IDs that are trusted by the second device.

\* \* \* \* \*